United States Patent
Kirchhoffer et al.

(10) Patent No.: US 9,518,619 B2
(45) Date of Patent: Dec. 13, 2016

(54) SYNCHRONIZING DEVICE

(71) Applicant: FORD GLOBAL TECHNOLOGIES, LLC, Dearborn, MI (US)

(72) Inventors: Johann Kirchhoffer, Köln (DE); John E. Robarge, Saline, MI (US); Ted A. Wroblewski, Royal Oak, MI (US); Thomas R. Hamm, Wixom, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/714,455

(22) Filed: May 18, 2015

(65) Prior Publication Data

US 2015/0330462 A1 Nov. 19, 2015

(30) Foreign Application Priority Data

May 19, 2014 (DE) .......................... 10 2014 209 441

(51) Int. Cl.
*F16D 11/00* (2006.01)
*F16D 23/06* (2006.01)
*F16D 23/04* (2006.01)

(52) U.S. Cl.
CPC ............... *F16D 23/06* (2013.01); *F16D 23/04* (2013.01); *F16D 2023/0618* (2013.01); *F16D 2023/0631* (2013.01)

(58) Field of Classification Search
CPC .. F16D 23/06; F16D 23/04; F16D 2023/0618; F16D 2023/0631
See application file for complete search history.

(56) References Cited

U.S. PATENT DOCUMENTS

| 4,869,353 | A | * | 9/1989 | Ohtsuki | F16D 23/06 192/53.31 |
| --- | --- | --- | --- | --- | --- |
| 5,113,986 | A | * | 5/1992 | Frost | F16D 23/06 192/53.341 |
| 2009/0133981 | A1 | * | 5/2009 | Tarasinski | F16D 23/04 192/53.3 |
| 2012/0006643 | A1 | * | 1/2012 | Sporleder | F16D 23/06 192/53.341 |
| 2014/0345403 | A1 | * | 11/2014 | Roper | F16D 23/025 74/339 |
| 2015/0068862 | A1 | * | 3/2015 | Fujii | F16D 11/14 192/84.9 |
| 2015/0292601 | A1 | * | 10/2015 | Tesar | F16D 13/26 475/149 |

FOREIGN PATENT DOCUMENTS

JP 2004076764 A 3/2004

* cited by examiner

*Primary Examiner* — David J Hlavka
(74) *Attorney, Agent, or Firm* — James Dottavio; MacMillan, Sobanski & Todd, LLC

(57) ABSTRACT

The invention relates to a synchronizing device with a synchronizer body, a sliding sleeve, a gearwheel with coupling toothing and a synchronizer ring which is displaceable between synchronizer body and coupling toothing axially in and counter to the synchronization direction(s). With the specification of being able to position the synchronizer ring reliably in a neutral position, it is proposed that the synchronizer ring is fixed to the synchronizer body in the neutral position by means of a spring device.

16 Claims, 4 Drawing Sheets

SYNCHRONIZING DEVICE

BACKGROUND OF INVENTION

The invention relates in general to a synchronizing device that may have a synchronizer body, a sliding sleeve, a gearwheel with coupling toothing and a synchronizer ring that is displaceable between synchronizer body and coupling toothing axially in and counter to the synchronization direction.

One problem in a synchronizing device of this type is that, when the sliding sleeve is returned from a shift position, in which the gearwheel is connected to the synchronizer body via the coupling toothing in an effective manner in terms of transmission, into a neutral position, in which the gearwheel is released from the synchronizer body, the synchronizer ring is frequently not returned precisely into this neutral position, but is still in frictional contact with the gearwheel. This may cause jolting or wobbling of the synchronizer body and/or of a cone system between synchronizer ring and gearwheel, which is associated with a corresponding production of noise which irritates the user. Likewise with a production of noise, this may be associated with a frequently asymmetrical loading of a bearing which is generally designed as a needle bearing and may cause shrieking of the needle bearing.

For example, in a synchronizing device of the type in question according to DE 35 36 361 A1 and DE 94 08 943 U, a radially spring-mounted latching element which is guided on the synchronizer body and is in the form of a cylindrical roller or a ball is provided. In the neutral position, the latching element is intended to engage in a receptacle which is provided centrally on the sliding sleeve and has radial slopes, as a result of which, in the neutral position, the latching element is positionally fixed centrally and radially on the inside on the sliding sleeve, but a precise radial alignment of the spring force does not have to be set and therefore a tilting moment can engage on the synchronizer ring causing tilting of same. It is therefore not possible for the synchronizer ring to be fully released from the shift wheel at the cones thereof, that is to say, it is not possible for a complete air gap to be formed between the cones, and force continues to be undesirably transmitted between the cones. The synchronizer ring can therefore not be brought reliably into the neutral position as specified.

EP 1 624 212 A1 proposes an equalizing lever, pivotable about a central axis for displacing the synchronizer ring against the blocking toothing, wherein the equalizing lever, arranged between two synchronizing devices arranged mirror-symmetrically with respect to each other, acts on the two synchronizer rings of the synchronizing devices.

According to DE 195 80 558 C1, the spring mounting of the latching element is released in a receptacle which is supported movably on the two synchronizer rings of the synchronizing devices arranged mirror-symmetrically with respect to each other, in order to counteract a tilting of the synchronizer rings.

In DE 10 2009 039 934 A1, on the path into the neutral position, the spring-mounted latching element, for the alignment thereof, is guided on radially conical, converging guide surfaces into the receptacle provided centrally on the sliding sleeve.

SUMMARY OF INVENTION

It is the object of the invention to provide a synchronizing device of the type in question, in which the synchronizer ring can be reliably positioned in the neutral position.

The object set is achieved according to the invention by the features of claim 1. Advantageous developments are described in the dependent claims. The object set is already achieved in that the synchronizer ring is fixed to the synchronizer body in a neutral position by means of a spring device.

With the fixing of the synchronizer ring by means of the spring device, reliable positioning of the synchronizer ring in the neutral position is achieved. The synchronizer ring is arranged so as to be movable into the neutral position by means of the spring device. The synchronizer ring can be brought into a defined neutral position against the synchronizer body by means of the spring device. The neutral position is defined by the fixing of the synchronizer ring to the synchronizer body. By means of the spring device, the synchronizer ring can be brought into a defined relative contact position with respect to the synchronizer body. This is always identical under normal operating conditions. The synchronizer ring is aligned on the synchronizer body in the neutral position. Since the position of the synchronizer body remains unchanged relative to the housing during the shift operation or relative to a drive shaft, which drives the synchronizer body, of the synchronizing device during the shift operation, the synchronizer ring, with the fixing thereof to the synchronizer body by means of the spring device, is brought into a consistently identical neutral position. An optimum radial and axial alignment of the synchronizer ring in the neutral position is made possible. For example, drag moments acting on synchronizer ring and gearwheel as a consequence, for example, of an inclination and/or an incomplete resetting of the synchronizer ring and also synchronizer ring noises irritating a user can therefore be avoided. In the neutral position, the synchronizer ring preferably bears against the synchronizer body under spring pretensioning.

In order to initiate the synchronization operation, the synchronizer ring is displaced on the drive shaft axially with respect to the gearwheel toward the coupling toothing in a synchronization direction away from the synchronizer body. In a manner advantageous in terms of force mechanics, it can be provided that, in order to return the synchronizer ring into the defined neutral position thereof, a spring force can be coupled axially into the synchronizer ring counter to the synchronization direction by means of the spring device. A correspondingly low-friction displacement of the synchronizer ring into the neutral position can therefore be achieved without tilting moments with respect to the synchronizer body counter to the synchronization direction. Unless expressly mentioned otherwise, the definition of the space and the directions thereof, such as axially, circumferentially and radially, relate to the drive shaft.

In a development of the synchronizing device, the spring device can have a spring arrangement which, by a first side, is supported in an effective manner in terms of spring force on a first stop element provided on the synchronizer ring. This support can take place directly or else indirectly. In a manner favorable in terms of force mechanics, the spring arrangement is supported by the first side thereof on the first stop element in the axial direction.

In a structurally simple manner, the first stop element can be designed as a ring element. The ring element can be arranged coaxially with respect to the synchronizer ring. It can be arranged fixed to the synchronizer ring. The ring element can be fixed to the synchronizer ring in a press fit. The synchronizer ring can have a first receptacle for the ring element. The receptacle can be designed as a plug-in receptacle. The first receptacle can be designed in the manner of a mouth with a mouth opening preferably facing radially outward. Alternatively, the first receptacle can have a radially outwardly facing surface with a purely radial surface normal or with a surface normal which is inclined slightly in the synchronization direction, but is substantially radial. The deviation of the inclined surface normal from the purely axial surface normal can be merely a few degrees, preferably up to 5 degrees.

The first stop element can be arranged on the synchronizer body preferably linearly in an axially guided manner. The first stop element can therefore be aligned precisely with respect to the synchronizer body over an axial guide path and can be guided on the synchronizer body. The guide function can take place with direct or indirect contact of the first stop element on the synchronizer body. The axial guide path can extend at least from the neutral position of the synchronizer ring to the bearing thereof on the gearwheel in a manner effective in terms of transmitting force. The axial guidance of the synchronizer ring on the synchronizer body can therefore take place during the entire synchronization. It can therefore be ensured that, during the synchronizing operation until the synchronizer ring is returned into the neutral position, no tilting of the synchronizer ring occurs.

This guidance can take place by means of the first stop element bearing preferably in a slidable manner against the synchronizer body. The first stop element can have a radially outwardly facing first sliding surface with a radial surface normal, in which the first stop element bears on the synchronizer body in a slidable manner over the guide path. The synchronizer body can have a radially inwardly facing second sliding surface which is congruent to or matches the first sliding surface of the first stop element for the direct bearing and guidance of the first stop element. The two sliding surfaces can in each case be arranged radially on the outside. In a development of the second sliding surface thereof, the synchronizer body can have, for example, a shoulder which extends in the synchronization direction and on which the first stop element is arranged in an axially guided manner radially on the outside. Customary synchronizer bodies can have a shoulder of this type which would possibly have to be adapted structurally.

The first stop element can have an inwardly facing bearing surface which is parallel to the first sliding surface thereof and in which the first stop element is fixed to the synchronizer ring. The stop element can therefore be easily mounted on the synchronizer ring in a manner aligned with the first sliding surface.

In a development of the synchronizing device, in the neutral position, the sliding sleeve can be arranged on the synchronizer body in a manner stabilized positionally against an axial displacement. The sliding sleeve can therefore be moved out of the neutral position only when a certain axial force is introduced. The sliding sleeve can be arranged here held on the synchronizer body in the neutral position via a snap connection or latching connection.

In a preferred embodiment of the synchronizing device, the spring device can be arranged in a manner effective in terms of spring force between synchronizer ring and synchronizer body. The spring arrangement can be supported in a manner effective in terms of spring force by the first side thereof on the synchronizer ring and by a second side on the synchronizer body.

In this connection, the spring device can have a second stop element which is fixedly connected to the synchronizer body. The spring arrangement can be supported axially by a second side on the second stop element.

Instead of being arranged directly on the synchronizer body, in particular on the shoulder thereof, for the slidable bearing and guiding of the first stop element, the second sliding surface, against which the first stop element bears in a slidable manner over the guide path, can be arranged on the second stop element. The second sliding surface can face radially inward. The first stop element therefore bears indirectly against synchronizer bodies, but even with the indirect bearing of the first stop element, a precise axial guidance of same can be achieved.

The second stop element advantageously engages over the spring arrangement radially on the outside in the synchronization direction, bounding a second receptacle, with the spring arrangement being able to be supported with the second side thereof in the synchronization direction on the second stop element. In this connection, the second stop element can bound a second receptacle for the spring arrangement and the first stop element radially to the outside.

The spring arrangement and/or the first stop element can be arranged in a manner guided linearly in the second receptacle. Bounding the second receptacle in the synchronization direction, the second stop element can be formed a U-shaped cross section with a front limb in the synchronizing direction, a rear limb in the synchronizing direction and a transverse web connecting the two limbs. The spring arrangement can be supported at the front in the synchronization direction on the rear limb while the front limb can be fixed to the synchronizer body. In a structural variant, the second stop element can have an L profile with only the rear limb and the transverse web, wherein the transverse web is fixed to the synchronizer body counter to the synchronization direction.

An alternative solution to the above-described solution with the spring force effectiveness of the spring device between synchronizer ring and synchronizer body to the object set can make provision for the spring device to be effective in terms of spring force between synchronizer ring and gearwheel.

In a development of the synchronizing device, it can be provided that the spring arrangement is supported by the second side axially on the gearwheel. Since the spring arrangement can be supported by the first side thereof on the synchronizer ring indirectly via the first stop element, the axial effect of spring force therefore takes place essentially on the gearwheel and the synchronizer ring.

This affords the advantage that, in the case of a customary arrangement of two synchronizing devices arranged mirror-symmetrically with respect to each other with a common central synchronizer body, the spring arrangements of the synchronizing device according to the invention are opposed to each other in terms of the action thereof. The neutral position of the synchronizer wheel and/or of the synchronizer rings guided on same can therefore firstly be set from both sides in force equilibrium. Furthermore, this enables a "ventilation clearance", i.e. an air gap between the cones of synchronizer ring and gearwheel, to be set.

In a development of the synchronizing device, the gearwheel can have a third receptacle, which is spaced apart radially inward with respect to the synchronizer ring, for axially guiding and supporting the spring arrangement in the synchronization direction. This radial spacing is necessary for structural reasons in order to permit engagement of the first stop element on the spring arrangement and therefore on the gearwheel in a manner effective in terms of transmitting force.

In order to support the first side of the spring arrangement, the spring device can have a third stop element which is guided on the gearwheel and is arranged mounted non-rotatably, but axially displaceably against the first stop element in a manner effective in terms of transmitting spring force.

The third stop element can be designed as a collared disk with a disk part and a radially outer collar piece extending in the synchronization direction. In this case, the spring arrangement can be supported with the second side thereof on the disk part and the disk part can be arranged guided axially radially on the inside on the gearwheel. The third stop element can be arranged mounted rotatably axially against the first stop element counter to the synchronization direction because of the relative movement between synchronizer ring and gearwheel outside the synchronization. The mounting can take place via a needle bearing.

The collar piece can preferably extend axially from the disk part in the synchronization direction. The collar piece can extend partially circumferentially on the slide part. For the torsion-proof mounting and axial guidance of the third stop element on the gearwheel, the third stop element can engage in an axial opening which is provided on the gearwheel and is matched to the stop element. Alternatively, the third receptacle can also have a U profile with an opening open with respect to the synchronizer body. The spring arrangement and the third stop element can therefore be blocked radially and arranged in a manner guided axially in the third receptacle.

In order to overcome the radial distance for the first receptacle on the synchronizer ring and the third receptacle on the gearwheel, the first stop element can be designed as an axially movably mounted rotary disk with a peripheral projection which extends in the synchronization direction. The projection can be arranged radially on the outside on the rotary disk. The projection can extend in the synchronization direction toward the synchronizer ring and can project into the first receptacle, wherein the projection is fixed in the direction radially inward, preferably in a press fit, on the synchronizer ring. The third stop element can furthermore be mounted on the rotary disk in an axially rotatable manner spaced apart radially inwards from the projection of the rotary disk, preferably via a needle bearing.

In a favorable manner in respect of damping noise, at least one of the stop elements can be manufactured from a material which is effective in terms of damping, such as plastic. At least one of the stop elements is preferably formed as a single piece.

The spring arrangement can have at least one spring element for producing the spring force. The spring element here can be of any desired type, with the prerequisite that the required spring force for returning the synchronizer body into the neutral position can be produced by the spring element. The spring element can thus be designed as a compression spring. It can be designed, for example, as a helical spring, disk spring or elastomeric spring made, in particular, of polyurethane, or a rubber spring. The elastomeric spring can be in the manner of a block and/or a single piece. For easier fitting into the second or third receptacle, the elastomeric spring can be designed radially inward with an oblique plane running in the radial direction.

For the introduction of a spring force symmetrically over the circumference into the synchronizer ring, it can be provided that at least two spring devices, preferably three spring devices, which are arranged identically spaced apart from one another circumferentially, are provided.

Alternatively, a synchronizing arrangement with two synchronizing devices according to one of the embodiments described previously and/or further on can be provided, in which the synchronizer ring is in each case fixed to the synchronizer body in a neutral position by means of a spring device and which have, in each case arranged mirror-symmetrically with respect to one another, a common, centrally arranged synchronizer body, wherein the spring devices of the two synchronizing devices are opposed to each other in the action thereof of spring force.

BRIEF DESCRIPTION OF DRAWINGS

The present invention is explained in more detail below with reference to embodiments of the synchronizing device that are illustrated in the drawings.

DETAILED DESCRIPTION

Figure 1:
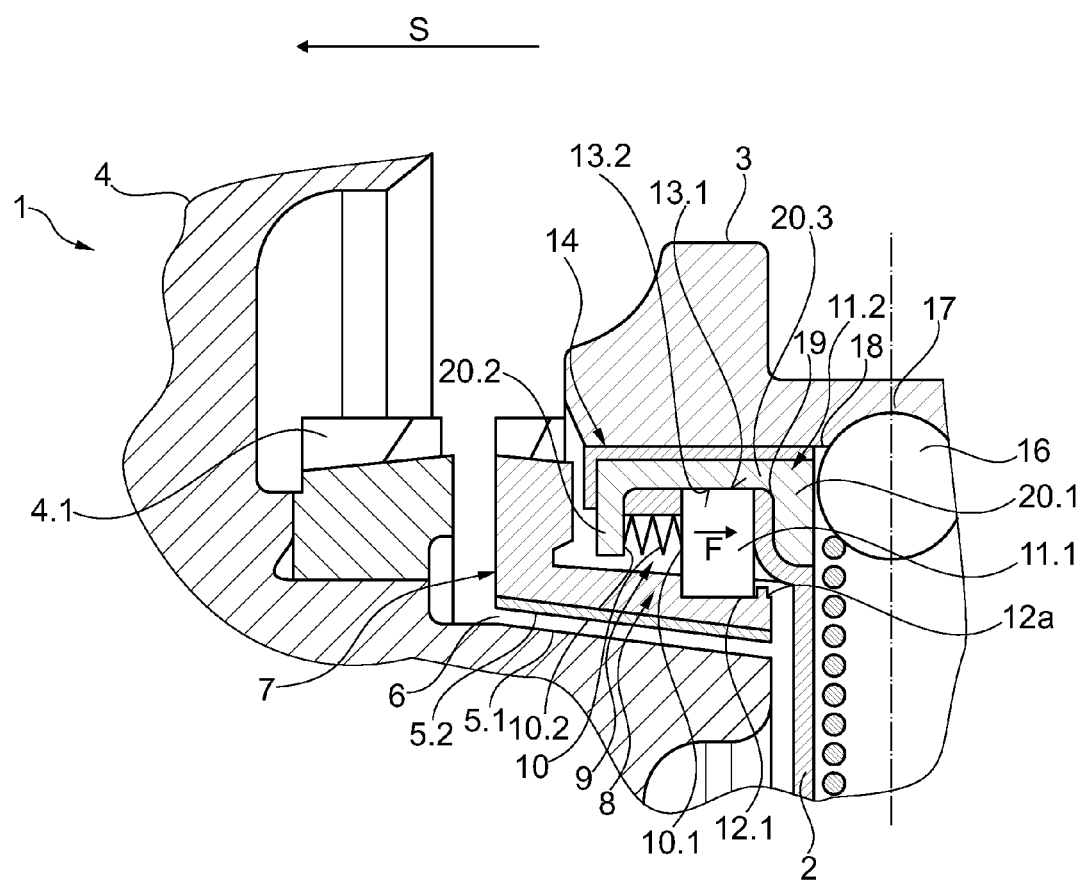
FIG. 1 shows a longitudinal sectional view with regard to a synchronization direction of an embodiment of a synchronizing device with synchronizer body and sliding sleeve in a neutral position.
Figure 2:
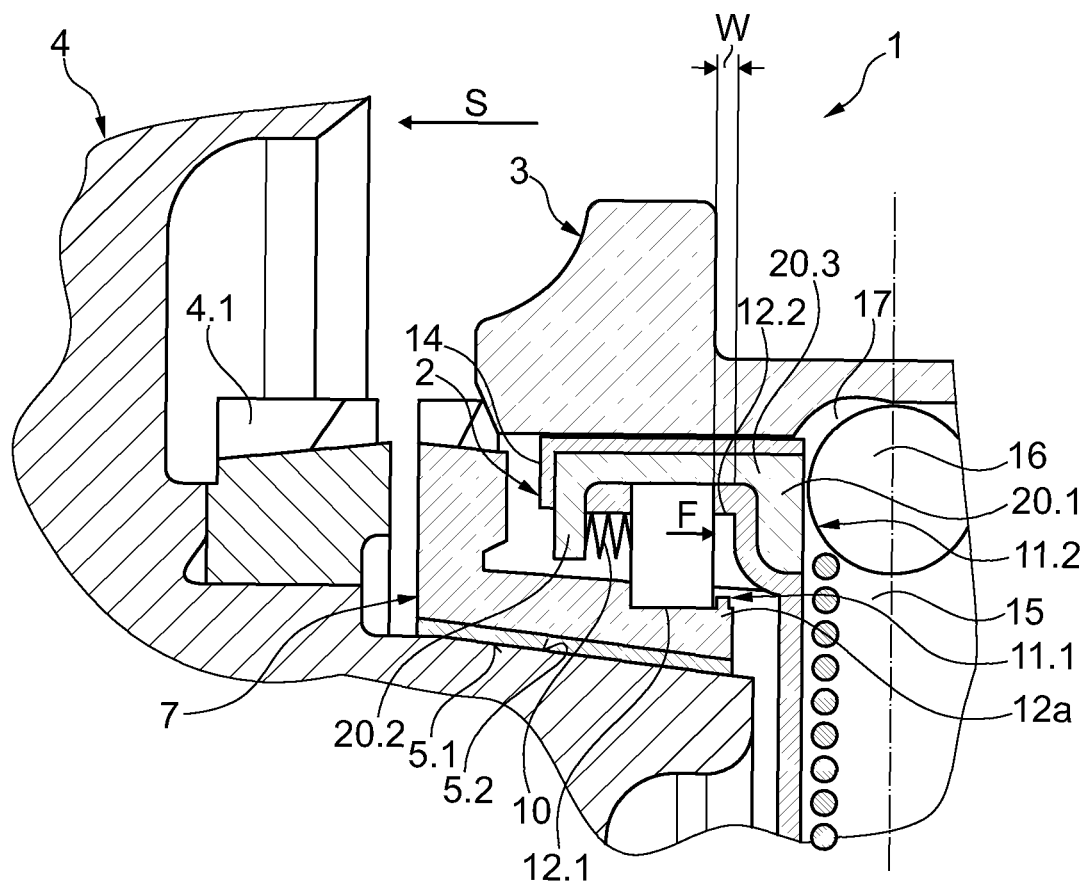
FIG. 2 shows a longitudinal sectional view of the embodiment of the synchronizing device according to FIG. 1, but in a synchronization position.
Figure 4:
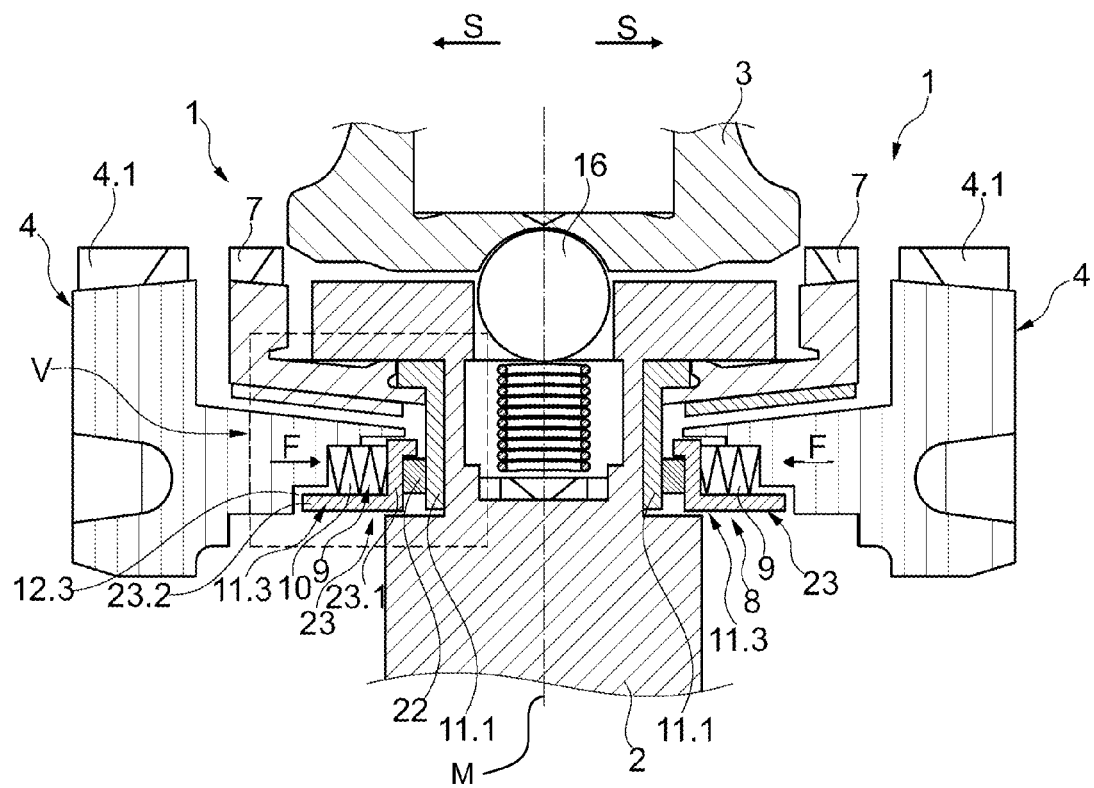
FIG. 4 shows a longitudinal sectional view with regard to a synchronization direction of an embodiment of the synchronizing device in the neutral position.

FIGS. 1 and 2 show a longitudinal sectional view with regard to a synchronization direction S of an embodiment of a synchronizing device 1 with synchronizer body 2, sliding sleeve 3, gearwheel 4 with a first cone 5.1 and coupling toothing 4.1 and a synchronizer ring 7 which is displaceable between synchronizer body 2 and coupling toothing 4.1 axially in and counter to the synchronization direction S with a second cone 5.2 in a neutral position, in which the cones 5.1, 5.2 are completely spaced apart from each other via an air gap 6, and in a synchronization position, in which the cones 5.1, 5.2 bear against each other in a manner effective in terms of transmitting torque. The synchronization direction S is implemented from the synchronizer body 2 toward the gearwheel 4. FIG. 4 reproduces a longitudinal sectional view of another embodiment of the synchronizing device 1 in the neutral position.

Figure 3:
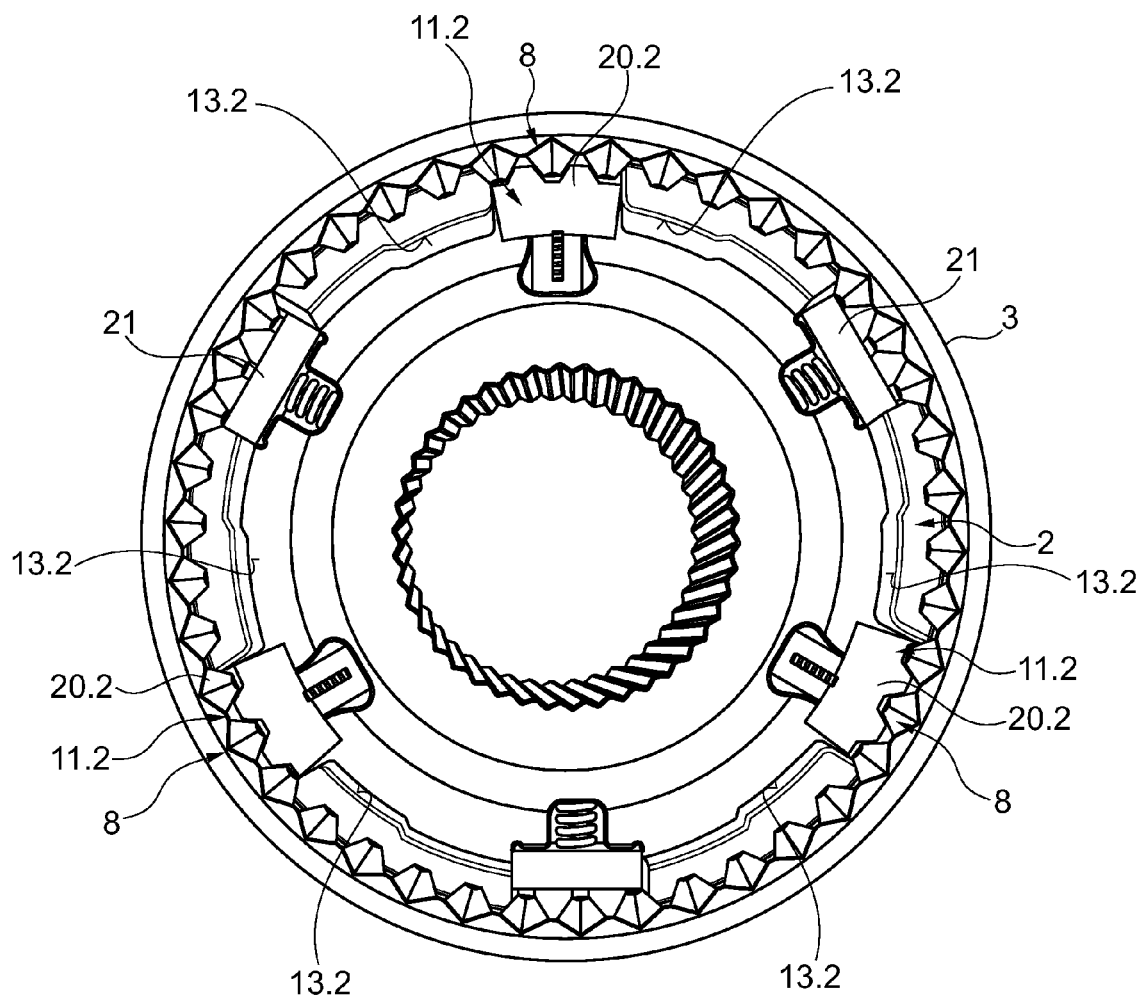
FIG. 3 shows an axial side view of the synchronizer body and the sliding sleeve of the synchronizing device according to FIG. 1.

The synchronizer ring 7 is arranged fixed to the synchronizer body 2 in the neutral position according to FIGS. 1 and 3 by means of a spring device 8. A spring force F can be coupled axially into the synchronizer ring 7 counter to the synchronization direction S by means of the spring device 8. The spring device 8 has a spring arrangement 9 with a spring element 10 which is supported by a first side 10.1 on a first stop element 11.1, which is provided on the synchronizer ring 7, in an effective manner in terms of spring force. The spring element 10 is, by way of example, a helical compression spring. A certain spring force F which is adjustable via the configuration of the spring device 8 can therefore be introduced axially into the synchronizer ring 7 counter to the synchronization direction S.

As is apparent in FIGS. 1 and 4, the synchronizer ring 7 bears against the synchronizer body 2 indirectly (FIG. 1) or directly (FIG. 4) in the neutral position. As a consequence of this sliding bearing of the synchronizer ring 7 in a manner guided in and counter to the synchronization direction, in the two cases mentioned above the relative position of the synchronizer ring 7 to the synchronizer body 2 over a guide path W (shown in FIG. 2) is precisely predetermined. The neutral position of the synchronizer ring 7 is therefore precisely defined.

With regard to a drive shaft (not illustrated here) for the synchronizer body 2, the first stop element 11.1 is designed as a ring element which is arranged coaxially with respect to the synchronizer ring 7 and is fixed to the synchronizer ring 7 in a press fit in a first receptacle 12.1. The first stop element 11.1 bears slidably on the synchronizer body 2 in a manner guided axially over guide path W between neutral position and synchronization position. The first stop element 11.1 has a radially outwardly facing first sliding surface 13.1 with a radial surface normal. The first stop element 11.1 bears with the first sliding surface 13.1 thereof slidably against a second sliding surface 13.2 which faces radially inward. In the embodiment of the synchronizing device 1 according to FIGS. 1 and 2, this second sliding surface 13.2 is arranged on a second stop element 11.2 which is fixed to the synchronizer body 2 or can be attached in the synchronizer body 2 directly via the shoulder 14. The first stop element 11.1 therefore bears indirectly or directly against the synchronizer body via the second stop element 11.2. The second sliding surface 13.2, in the embodiment of the synchronizing device 1 according to FIG. 4, is arranged on the synchronizer body 2 directly on a shoulder 14, which lies radially on the outside and extends in the synchronizing direction s, with the second sliding surface 13.2 likewise facing radially inward, and therefore the first stop element 11.1 is arranged guided directly on the synchronizer body 2 axially in and counter to the synchronization direction S.

In the neutral position, the sliding sleeve 3 is arranged on the synchronizer body 2 in a manner stabilized positionally against axial displacement in order likewise to hold the sliding sleeve in a defined neutral position, wherein the sliding sleeve can be moved out of the neutral position by initiating a certain axial force. In the neutral position, the sliding sleeve 3 is arranged held on the synchronizer body 2 via a snap connection or latching connection. For this purpose, the synchronizer body 2 has, axially centrally, a radially outwardly open ball socket 15 with a spring-loaded ball 16 which, guided radially toward the sliding sleeve 3 in the neutral position, latches into a recess 17 which is provided radially on the inside and axially centrally on the sliding sleeve 3 and is in the manner of a spherical cap, wherein the ball 16 is guided toward an aperture 18 overlapping the ball socket 15 and, in the neutral position, protrudes radially over the aperture 18.

The two embodiments differ in particular in that, in the embodiment of the synchronizing device 1 according to FIGS. 1 and 2, the spring device 8 is effective in terms of spring force between synchronizer ring 7 and synchronizer body 2 and, in the embodiment of the synchronizing device 1 according to FIG. 4, is effective in terms of spring force between synchronizer ring 7 and gearwheel 4.

Furthermore referring to the embodiment according to FIGS. 1 and 2, the spring device 8 has a second stop element 11.2 which is fixedly connected to the synchronizer body 2 and on which the spring arrangement 9 is supported axially by a second side 10.2. The second stop element 11.2 engages over the spring arrangement 9 radially on the outside in the synchronization direction S bounding a second receptacle 12.2, with the spring arrangement 9 being supported by the second side 10.2 thereof axially at the rear in the synchronization direction S on the second stop element 11.2 (FIGS. 1 and 2). The first receptacle 12.1 has a U-shaped profile with a front projection 12a in the synchronization direction S, as a result of which the annular first stop element 11.1 is held in a manner secure against displacement axially.

With reference to the example of the embodiment of the synchronizing device 1, FIG. 3 here clarifies the positioning of the spring device on the synchronizer body 2 and with respect to the sliding sleeve 3, wherein the latter are shown in an axial side view, specifically counter to the synchronization direction S. Three spring devices 8 which, because of force symmetry with respect to a drive axis (not illustrated here) for the synchronizer body 2, are identically spaced apart circumferentially, i.e. are arranged at an angle of rotation of 120° with respect to one another, are provided here.

The second stop element 11.2 of each spring devices 8 is of partially annular design and is fixed under a lateral compressive stress in a pocket-like plug-in receptacle 19 embedded in the synchronizer body 2. As is apparent in FIGS. 1 and 2, the second stop element 11.2 has a U-shaped cross section with a front limb 20.1 in the synchronizing direction S, a rear limb 20.2 in the synchronizing direction S and a transverse web 20.3 connecting the two limbs 20.1, 20.2. The spring element 10 of the spring arrangement 9 is supported at the rear in the synchronization direction S on the rear limb 20.2 while the front limb 20.1 is fixed in the plug-in receptacle 19 on the synchronizer body 2. As can be gathered from FIGS. 1 and 2, the rear limb 20.2 extends radially inward beyond the shoulder 14 of the synchronizer body 2.

The transverse web 20.3 runs in the synchronization direction S and has, radially on the inside, the second sliding surface 13.2 against which the first stop element 11.1 bears in an axially slidable manner by the first sliding surface 13.1 thereof. The second sliding surface 13.2 can also be directly attached by the shoulder 14 to the synchronizer body 2. The synchronizer ring 7 is therefore precisely in and counter to the synchronization direction S by sliding bearing of the first stop element 11.1 at the first sliding surface 13.1 thereof of the second stop element 11.2, wherein, in the neutral position, the first stop element 11.1 strikes in a defined manner against the synchronizing body 2 counter to the synchronization direction S.

FIG. 3 furthermore shows customary spring-loaded sliding blocks 21 for the axial displacement of the synchronizer ring 7 in the synchronization direction S, wherein the sliding blocks 21 are likewise arranged spaced apart from one another at an angle of rotation of 120° and spread apart from the respectively adjacent spring devices 8 by an angle of rotation of 60°.

FIG. 4 shows by way of example two identical synchronizing devices 1 which are arranged mirror-symmetrically with respect to a central longitudinal axis M of the synchronizer body 2, wherein the spring devices 8 have axial spring forces 'F' which are opposed to one another and are in each case effective in terms of spring force between the associated synchronizer ring 7 and the two associated synchronizer bodies 2. In the case of the two synchronizing devices 1, the spring arrangement 9 is supported by the second side 10.2 axially in the synchronization direction S on the gearwheel 4, wherein the gearwheel 4 has a third receptacle 12.3, which is spaced apart radially inward from the synchronizer ring 7, for axially guiding and radially blocking and supporting the spring element 10 of the spring arrangement 9 in the synchronization direction S.

As is apparent from FIG. 4, the width of the air gap 6 bounded by the cones 5.1, 5.2 can be set via the setting and/or selection of the spring force. This can take place, for example, by a change in a designated pretension, in which the first stop element 11.1 bears indirectly or directly against the synchronizing body 2.

Figure 5:
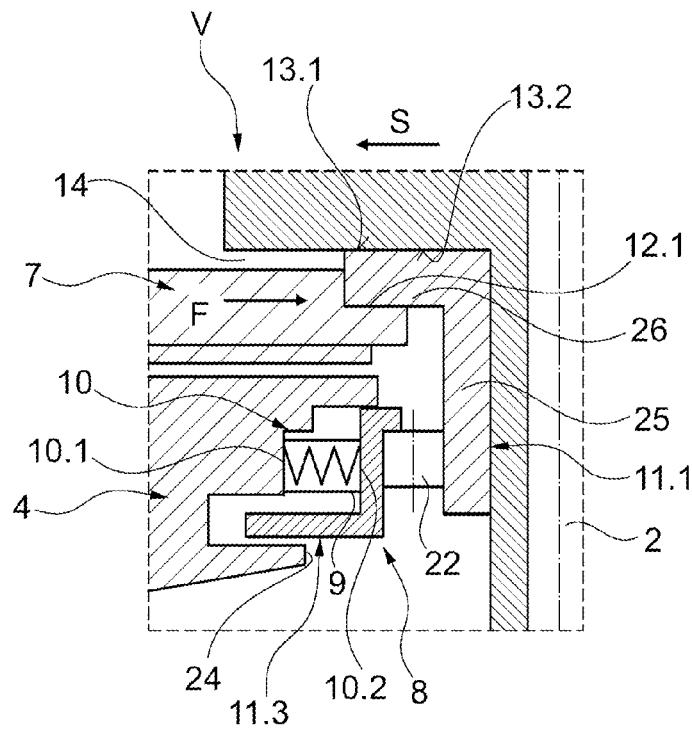
FIG. 5 shows an enlargement of a detail V according to FIG. 4.

FIG. 5 shows an enlargement of a detail V according to FIG. 4, wherein the enlargement essentially covers the spring device 8 of the synchronizing device 1 on the left in FIG. 4. In order to support the first side 10.1 of the spring arrangement 9, the spring device 8 has a third stop element 11.3 which is guided on the gearwheel 4 and is arranged mounted rotatably here against the first stop element 11.1 counter to the synchronization direction S via a needle bearing 22 in a manner effective in terms of transmitting spring force F.

The third stop element 11.3 is designed here as a collared disk 23 with a disk part 23.1 and a radially outer collar piece 23.2 extending in the synchronization direction S. The spring element 10 of the spring arrangement 9 is supported by the second side 10.2 thereof on the disk part 23.1. The disk part 23.1, for its part, is guided axially radially on the inside on the gearwheel 4 and is mounted rotatably on the against the first stop element counter to the synchronization direction S via the needle bearing 22. In the region of the spring device 8, the gearwheel 4 has an axial opening 24 open counter to the synchronization direction. The collar piece 23 is of partially circumferential design and extends only over the circumferential region provided for the opening 24, wherein the collar piece 23.2 engages in the axial opening 25 for the torsion-proof mounting and for the further axial guidance and axial movability of the third stop element 11.3.

It can be implicitly gathered from FIG. 3 that three spring devices 8 are provided for the respective synchronizing device 1. The spring devices 8 which, as shown by way of example in FIG. 3 with reference to the first embodiment of the synchronizing device 1, are arranged identically spaced apart from one another circumferentially at an angle of rotation of 120°. In a corresponding manner, the collared disk 23 has a respective collar piece 23.3 for the three spring devices 8, i.e. a total of three collar pieces 23.2 which each engaged in a designated opening 24 on the gearwheel 4.

In the second embodiment of the synchronizing device 1, the first stop element 11.1 is designed as an axially movably mounted rotary disk 25 with an axially outer, peripheral projection 26 extending in the synchronization direction S. The rotary disk 25 is fixed at the front in the synchronization direction S in the first receptacle 12.1 on the synchronizer ring 6 by means of a press fit in the direction radially inward. The projection 26 has the radially outwardly facing first sliding surface 13.1 with a radial surface normal, in which the first stop element 11.1 bears directly against the synchronizer body 2 in an axially slidable manner on the second sliding surface 13.2 of the shoulder 14 of the synchronizer body 2.

As can be directly gathered from FIGS. 1-5, the stop elements 11.1, 11.2, 11.3 are in each case formed as a single piece. Furthermore, the stop elements 11.1, 11.2, 11.3 are in each case manufactured from a plastic which is effective in terms of damping, as a result of which a possible development of noise can be further reduced.

While certain embodiments of the present invention have been described in detail, those familiar with the art to which this invention relates will recognize various alternative designs and embodiments for practicing the invention as defined by the following claims.

The invention claimed is:

1. A synchronizing device comprising:
a synchronizer body;
a sliding sleeve axially slidable on the synchronizer body;
a gearwheel, adjacent to the synchronizer body, including coupling toothing;
a synchronizer ring displaceable between the synchronizer body and the coupling toothing axially in and counter to a synchronization direction;
a spring biasing the synchronizer ring into a fixed neutral position relative to the synchronizer body, the spring having a first side supported by the spring force on a first stop element on the synchronizer ring, the first stop element including a ring element located coaxially with respect to the synchronizer ring and is fixed on the synchronizer ring in a first receptacle.

2. The synchronizing device as claimed in claim 1, wherein the spring creates the spring force biased axially into the synchronizer ring counter to the synchronization direction.

3. The synchronizing device as claimed in claim 1, wherein the first stop element is oriented on the synchronizer body in an axially guided manner.

4. The synchronizing device as claimed in claim 3, wherein the first stop element has a radially outwardly facing first sliding surface with a radial surface normal, on which the first stop element bears on the synchronizer body over an axial guide path.

5. The synchronizing device as claimed in claim 1, including a second stop element which is fixedly connected to the synchronizer body and on which the spring is supported axially by a second side.

6. The synchronizing device as claimed in claim 5, wherein the second stop element engages over the spring radially on the outside in the synchronization direction, bounding a second receptacle, with the spring being supported with the second side thereof at the rear in the synchronization direction on the second stop element.

7. The synchronizing device as claimed in claim 1, wherein at least one of the stop elements is manufactured from an elastomeric plastic.

8. A synchronizing device comprising:
a synchronizer body;
a sliding sleeve axially slidable on the synchronizer body;
a gearwheel, adjacent to the synchronizer body, including coupling toothing;
a synchronizer ring displaceable between the synchronizer body and the coupling toothing axially in and counter to a synchronization direction;
a spring biasing the synchronizer ring into a fixed neutral position relative to the synchronizer body, the spring configured with a first side supported by the spring force on a first stop element provided on the synchronizer ring;
a second stop element fixedly connected to the synchronizer body and on which the spring is supported axially by a second side.

9. A synchronizing device comprising:
a sliding sleeve axially slidable on a synchronizer body;
a gearwheel, adjacent to the synchronizer body;
a synchronizer ring displaceable between the synchronizer body and the gearwheel axially in a synchronization direction;
a spring, biasing the synchronizer ring into a fixed neutral position relative to the synchronizer body, having a first side spring force biased on a first stop element, which is elastomeric plastic, on the synchronizer ring.

10. A synchronizing device comprising:
a sliding sleeve axially slidable on a synchronizer body;
a gearwheel, adjacent to the synchronizer body;
a synchronizer ring displaceable between the synchronizer body and the gearwheel axially in a synchronization direction;
a spring biasing the synchronizer ring into a fixed neutral position relative to the synchronizer body, the spring providing a spring force acting on the synchronizer ring and the gearwheel.

11. The synchronizing device as claimed in claim 10, wherein the spring is supported by the second side axially on the gearwheel.

12. The synchronizing device as claimed in claim 11, wherein the gearwheel has a third receptacle, which is spaced apart radially inward with respect to the synchronizer ring, for axially guiding and supporting the spring in the synchronization direction.

13. The synchronizing device as claimed in claim 10, wherein, in order to support the first side of the spring, the spring has a third stop element which is guided on the gearwheel and is mounted rotatably against the first stop element transmitting spring force.

14. The synchronizing device as claimed in claim 13, wherein the third stop element is designed as a collared disk with a disk part and a radially outer collar part extending in the synchronization direction, with the spring being supported by the second side thereof on the disk part and the disk part being guided axially radially on the inside on the gearwheel and being mounted rotatably axially against the first stop element counter to the synchronization direction.

15. The synchronizing device as claimed in claim 14, wherein, for a torsion-proof mounting and axial guidance of the third stop element on the gearwheel, the collar part engages in an axial opening provided on the gearwheel.

16. The synchronizing device as claimed in claim 10, wherein the first stop element is designed as an axially movably mounted rotary disk with an axially outer, peripheral projection which extends in the synchronization direction and is fixed radially inward to the synchronizer ring.

* * * * *